US008818964B2

(12) United States Patent
Tevis et al.

(10) Patent No.: US 8,818,964 B2
(45) Date of Patent: Aug. 26, 2014

(54) OPTIMIZATION OF A COMPUTING ENVIRONMENT IN WHICH DATA MANAGEMENT OPERATIONS ARE PERFORMED

(75) Inventors: Gregory John Tevis, Tucson, AZ (US); David Gregory Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/613,930

(22) Filed: Sep. 13, 2012

(65) Prior Publication Data

US 2013/0013572 A1 Jan. 10, 2013

Related U.S. Application Data

(62) Division of application No. 12/633,783, filed on Dec. 8, 2009, now Pat. No. 8,554,743.

(51) Int. Cl.
*G06F 17/00* (2006.01)

(52) U.S. Cl.
USPC .......................................... 707/692; 707/736

(58) Field of Classification Search
None
See application file for complete search history.

(56) References Cited

U.S. PATENT DOCUMENTS

| 6,886,020 B1 | 4/2005 | Zahavi et al. |
| 7,343,453 B2 | 3/2008 | Prahlad et al. |
| 7,343,459 B2 | 3/2008 | Prahlad et al. |
| 7,346,751 B2 | 3/2008 | Prahlad et al. |
| 8,190,742 B2 | 5/2012 | Fineberg et al. |
| 2002/0176624 A1 | 11/2002 | Kostrzewski et al. |
| 2003/0185209 A1 | 10/2003 | Lee |
| 2005/0147057 A1* | 7/2005 | LaDue ........................ 370/310 |
| 2008/0126812 A1 | 5/2008 | Ahmed et al. |
| 2008/0294660 A1 | 11/2008 | Patterson et al. |
| 2010/0046372 A1* | 2/2010 | Samuels et al. ............... 370/235 |
| 2010/0050040 A1* | 2/2010 | Samuels et al. ............... 714/749 |
| 2010/0085966 A1 | 4/2010 | Samuels et al. |
| 2011/0138154 A1 | 6/2011 | Tevis et al. |
| 2012/0143715 A1 | 6/2012 | Eshghi et al. |

OTHER PUBLICATIONS

A.Traeger, E. Zadok, N. Joukov and C.P. Wright; 'A Nine Year Study of file System and Storage Benchmarking'. ACM Transactions on Storage, vol. 4, No. 2, Article 5; May 2008.

(Continued)

*Primary Examiner* — Wilson Lee
(74) *Attorney, Agent, or Firm* — David W. Victor; Konrad, Raynes, Davda and Victor LLP

(57) ABSTRACT

Described are embodiments of an invention for optimizing a computing environment that performs data management operations such as encryption, deduplication and compression. The computing environment includes data components and a management system. The data components operate on data during the lifecycle of the data. The management system identifies all the data components in a data path, how the data components are interconnected, the data management operations performed at each data component, and how many data management operations of each type are performed at each data component. Further, the management system builds a data structure to represent the flow of data through the data path and analyzes the data structure in view of policy. After the analysis, the management system provides recommendations to optimize the computing environment through the reconfiguration of the data management operation configuration and reconfigures the data management operation configuration to optimize the computing environment.

16 Claims, 7 Drawing Sheets

(56) References Cited

OTHER PUBLICATIONS

F.R. Bach, M.I. Jordan; 'Beyond Independent Components: Trees and Clusters'. Journal of Machine Learning Research 4 (2003); pp. 1205-1233. Dec. 2003.

J. Sermulins, W. Thies, R. Rabbah and S. Amarasinghe; 'Cache Aware Optimization of Stream Programs'. Computer Science and Artificial Intelligence Laboratory, Massachusetts Institute of Technology; pp. 115-126. Jun. 15-17, 2005.

US Patent Application, dated Dec. 8, 2009, for U.S. Appl. No. 12/633,783 (37.320), filed Dec. 8, 2009, entitled, "Optimization of a Computing Environment in Which Data Management Operations are Performed", invented by Gregory Tevis et al., pp. 1-40.

Restriction Requirement, dated Jun. 7, 2012, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-7.

Response to Restriction Requirement, dated Jun. 19, 2012, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-2.

Office Action, dated Jul. 11, 2012, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-8.

Response to Office Action, dated Oct. 11, 2012, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-14.

Final Office Action, dated Dec. 21, 2012, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-10.

Response to Final Office Action, dated Mar. 21, 2013, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-12.

Notice of Allowance, dated May 28, 2013, for U.S. Appl. No. 12/633,783 (37.320), filed Dec. 8, 2009, entitled, "Optimization of a Computing Environment in Which Data Management Operations Are Performed", invented by Gregory Tevis et al., pp. 1-11.

\* cited by examiner

OPTIMIZATION OF A COMPUTING ENVIRONMENT IN WHICH DATA MANAGEMENT OPERATIONS ARE PERFORMED

CROSS-REFERENCE TO RELATED APPLICATION

This application is a divisional application of copending U.S. application Ser. No. 12/633,783, filed Dec. 8, 2009, which is incorporated herein by reference and is relied upon for claiming the benefit of priority.

TECHNICAL FIELD

The invention relates to computing environments in which data management operations, such as encryption, deduplication and compression are performed.

BACKGROUND

Recent advances in information technology have lead to the proliferation of data management operations such as data encryption, data deduplication and data compression.

Data compression is the process of encoding information using fewer bits than an unencoded representation would use. Data deduplication generally refers to the elimination of redundant subfiles (e.g. blocks, chunks, or extents) from data objects. Data deduplication and data compression are data management technologies that are useful to reduce the consumption of expensive resources, such as storage space and transmission bandwidth.

Data encryption is the process of transforming information using an algorithm to make it unreadable to anyone except those possessing special knowledge (e.g. a key). Data encryption is used to protect data where it is stored as well as while the data is in transit. For example, data encryption may protect data as it is being transferred via networks.

Administrators are tasked with developing security and data reduction strategies utilizing the data management operations of encryption, deduplication, and compression to optimize the computing environment. Each component of the computing environment may be under the responsibility of a different administrator (e.g. the system/application administrator, a network administrator, a storage administrator, a security administrator, server administrator, etc.). In most cases, the administrator for one domain does not have sufficient information about the data management operations and the data flow topology at the other domains. As a result, the data management operations applied in one domain may be redundant in light of data management operations applied at another domain, or even in certain circumstances, the data management operations in one data component may be in contention with other data management operations.

SUMMARY OF THE INVENTION

Described are embodiments of an invention for optimizing a computing environment that performs data management operations such as encryption, deduplication and compression. The computing environment includes data components and a management system. The data components operate on data during the lifecycle of the data. The management system identifies all the data components in a data path, how the data components are interconnected, the data management operations performed at each data component, and how many data management operations of each type are performed at each data component. Further, the management system builds a data structure to represent the flow of data through the data path and analyzes the data structure in view of policy. After the analysis, the management system provides recommendations to optimize the computing environment through the reconfiguration of the data management operation configuration and reconfigures the data management operation configuration to optimize the computing environment.

For example, an embodiment of a computer implemented method for data management in a computing environment includes discovering data components of the computing environment, such that at least one data component performs a data management operation. The method also creates a data flow topology representing a data path through the data components. Further, the method optimizes the data path by analyzing the data flow topology.

In yet another embodiment, the method for data management in a computing environment analyzes a data flow topology of data components within the computing environment. The data flow topology includes an order of the data management operations performed on the data. The method evaluates the data flow topology in view of data management policy and determines an optimal sequence of the data management operations within the computing environment.

In an embodiment of a computing environment, the environment includes memory coupled to a processor of a management system. The memory includes instructions implemented by the processor to discover data components of the computing environment, such that each data component performs a data management operation. Further, the environment creates a data flow topology representing a data path through the data components and optimizes the data path by analyzing the data flow topology.

In another embodiment of a computing environment, the environment includes memory coupled to a processor of a management system. The memory includes instructions implemented by the process to analyze a data flow topology of the data components with the computing environment, such that the data flow topology includes an order of data management operations performed on the data. Further, the environment evaluates the data flow topology in view of the data management policy and determines an optimal sequence of data management operations within the computing environment.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENT

Described are embodiments of an invention for optimizing a computing environment that performs data management operations such as encryption, deduplication and compression. The computing environment includes data components and a management system. The data components operate on data during the lifecycle of the data. The management system identifies all the data components in a data path, how the data components are interconnected, the data management operations performed at each data component, and how many data management operations of each type are performed at each data component. Further, the management system builds a data structure to represent the flow of data through the data path and analyzes the data structure in view of policy. After the analysis, the management system provides recommendations to optimize the computing environment through the reconfiguration of the data management operation configuration and reconfigures the data management operation configuration to optimize the computing environment.

Figure 1:
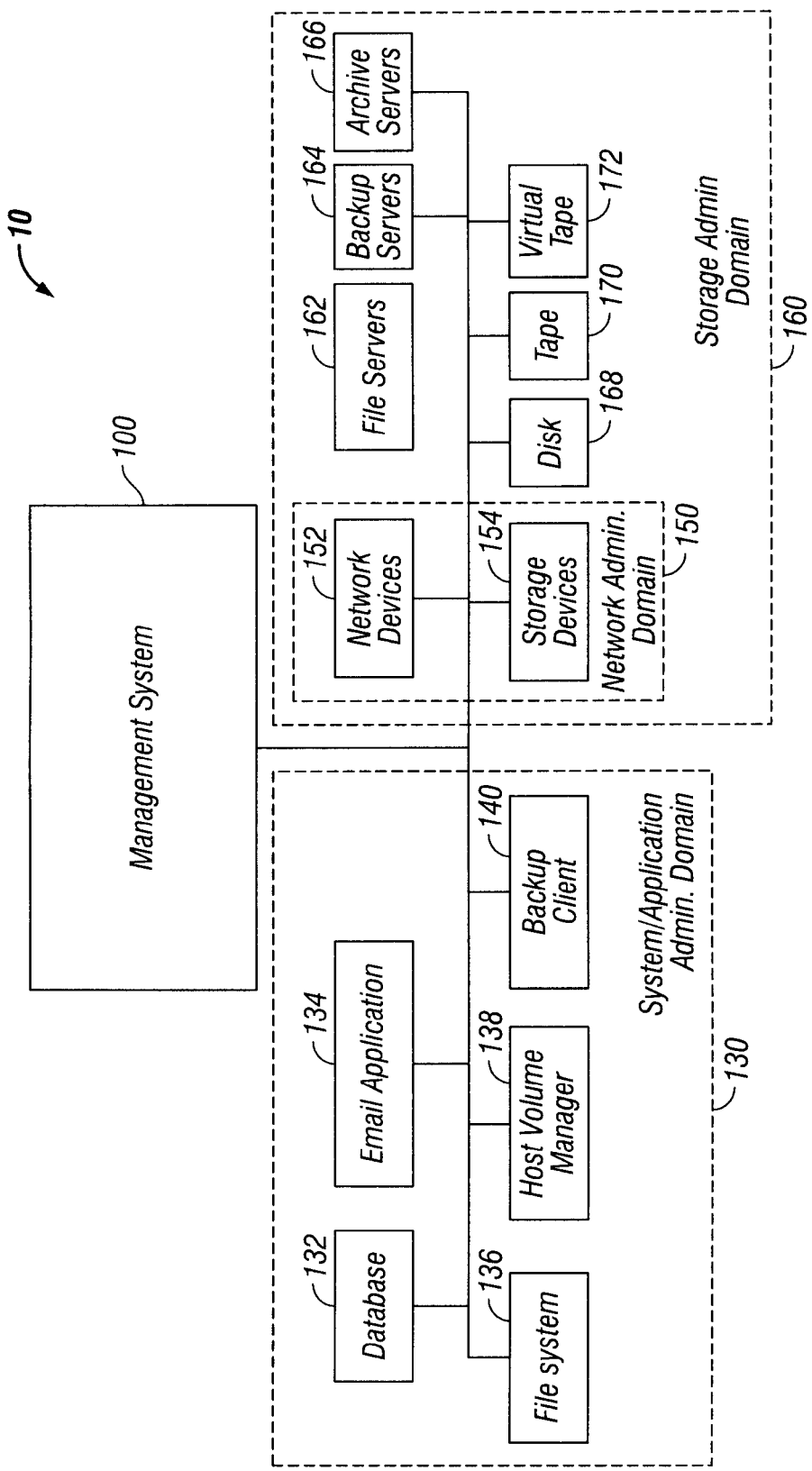
FIG. 1 illustrates computing environment in accordance with an embodiment of the invention.

FIG. 1 illustrates a data computing environment, having data components, in which data management operations such as data encryption, data deduplication, and data compression are performed. Data encryption, data deduplication and data compression will, hereinafter, be referred to simply as encryption, deduplication, and compression.

Data components are resources or entities that create, store, transfer, manage, process or in some way operate on data during the lifecycle of the data. For example, data components may include resources or entities that perform encryption, deduplication, and compression upon data. Data components include, but are not limited to, databases, email applications, file systems, operating system software (e.g. device drivers), logical host volume managers, various network devices, various storage network devices, network file servers, backup client devices, tape storage devices, virtual tape storage devices, etc. One of ordinary skill in the art would recognize any device, hardware, or software, that has an ability to create, store, transfer, manage, process or in some way operate on data during the lifecycle of data, may be a data component. It should be appreciated that each data component may utilize one or more data management operations such as reading, writing, encryption, deduplication, compression, etc.

The computing environment of FIG. 1 includes a management system 100. It should be appreciated that management system 100 may be any system capable of managing data management operations, such as encryption, deduplication, compression read and/or write operations or the like. For example management system 100 may be IBM® Tivoli Storage Productivity Center (TPC). The data management system is coupled to data components, such as database 132, email application 134, file system 136, host volume manager 138, backup client 140, network devices 152, storage devices 154, file servers 162, backup servers 164, archive servers 166, disk 168, tape 170, and virtual tape (with deduplication capability) 172.

For example, referring to FIG. 1, data management operations, such as encryption, deduplication, and compression, may be performed in a database 132, email application 134, file system 136, host volume manager 138, and a backup client 140. In one example, database 132, email application 134, file system 136, host volume manager 138, and a backup client 140 are included in the system/application domain 130. Therefore, in this example, a system/application administrator would be responsible for configuring the data management operations within database 132, email application 134, file system 136, host volume manager 138, and a backup client 140.

Further, data management operations, such as encryption, deduplication, and compression, may be performed in network devices 152, storage network devices 154, file servers 162, backup servers 164, archive servers 166, disk 168, tape 170 and virtual tape 172. In one example, network devices 152, storage network devices 154, file servers 162, backup servers 164, archive servers 166, disk 168, tape 170 and virtual tape 172 are included in the storage administrator's domain 160. Therefore, in this example, a storage administrator would be responsible for configuring the data management operations within network devices 152, storage network devices 154, file servers 162, backup servers 164, archive servers 166, disk 168, tape 170 and virtual tape 172.

Subsets of data components that fall under the storage administrator's domain also fall under the network administrator's domain 150. In one example, network devices 152 and storage network devices 154 are included in the network administrator's domain 150. Therefore, in this example, a network administer would also be responsible for configuring the data management operations within network devices 152 and storage network devices 154.

As discussed above, each data component of the computing environment may be under the responsibility of a different administrator (e.g. the system/application administrator, a network administrator, a storage administrator, a security administrator, server administrator etc.). The administrators are tasked with developing security and data reduction strategies utilizing the data management operations to optimize the computing environment. In most cases, the administrator for one domain does not have sufficient information about the data management operations and the data flow topology at the other domains. As a result, the data management operations applied in one domain may be redundant in light of data management operations applied at another domain, or even in certain circumstances, the data management operations in one data component may be in contention with data management operations in another data component, or a data management operation in a data component may be in contention with another data management operation within the same data component.

Encryption, deduplication, and compression consume significant amounts of computer resources to perform. Performing encryption, deduplication, and compression, redundantly, or in contention with other data management operations, consumes large amounts of system resources (e.g. CPU cycles, memory usage, and disk I/O activity), and thus, increases processing costs, while adding very little value.

For example, performing redundant data management operations along a data path may be counterproductive and introduce unnecessary processing overhead. As mentioned above, encryption transforms data to make it unreadable without a key. Therefore, performing encryption on data that is already encrypted, and thus unreadable, adds unnecessary processing overhead. Further, deduplication refers to the elimination of redundant data. Thus, performing deduplication on already deduplicated data adds unnecessary overhead. Still further, compression searches for redundant data strings in a file, and replaces the redundant strings with a token. Therefore, performing compression of data that has already been compressed can also introduce unnecessary processing overhead.

Furthermore, the data management operations should be performed in an order that does not create contention between other data management operations. For example, performing encryption before performing deduplication may be counterproductive. The success of deduplication in part hinges on the ability to identify duplicate data. The encryption process randomizes data based on varying encryption keys. Therefore, the randomization of data that results from encryption defeats subsequent deduplication operations.

Further, performing encryption before performing compression may be counterproductive. The compression process typically searches for redundant data strings in a file, and replaces the redundant strings with a token, thus reducing or compressing the size of the file. The encryption process, as discussed above, randomizes data, making it unrecognizable. Therefore, the randomization of data that results from encryption, removes redundancy, and makes subsequent compression either impossible or ineffective.

Accordingly, it is desirable to configure data management operations such as encryption, deduplication, and compression such that they do not contend with one another. Therefore, there is a need for a method and system to identify all the data components in data paths where encryption, deduplication, and compression are being performed, to analyze the interactions and impacts of those operations on each other, and the overall storage system, to notify administrators of any potentially non-optimized configurations, and to make recommendations, and to optimize certain data management operations through reconfiguration of the data management operations at each data component.

Figure 2:
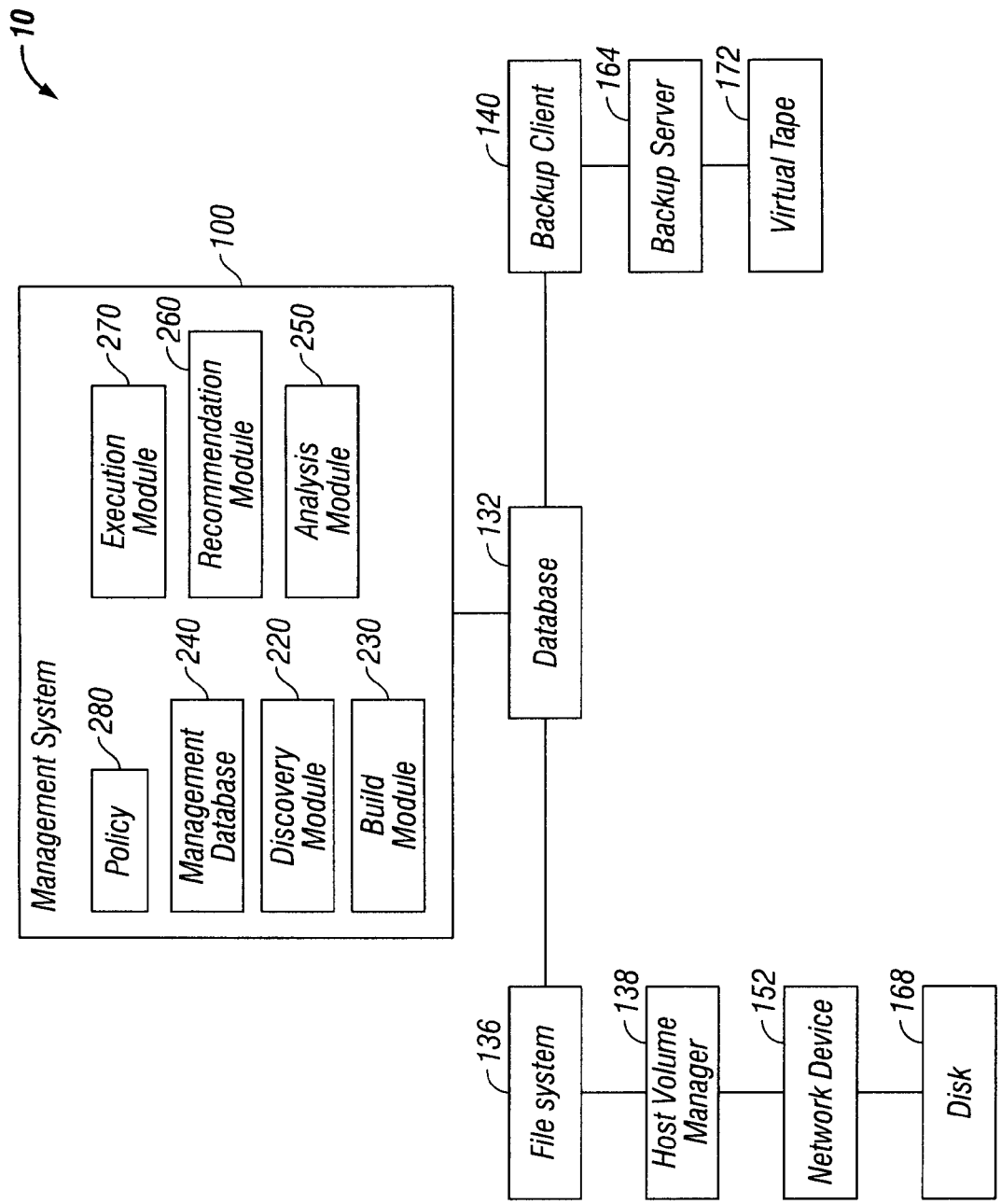
FIG. 2 illustrates a management system in an exemplary computing environment in accordance with an embodiment of the invention.

FIG. 2 illustrates a management system 100 in an exemplary computing environment 10 in accordance with an embodiment of the invention. Management system 100 includes discovery module 220, build module 230, management database 240, analysis module 250, recommendation module 260, execution module 270, and a data management policy 280 (hereinafter referred to as policy). Management system 100 is coupled to data components. In the exemplary computing environment, the management system 100 is coupled to database 132. The database 132, resides on file system 136. File system 136, in turn, uses storage managed and presented by host volume manager 138. Data I/Os are passed through storage network devices 152 (e.g. a router), and reside on storage devices, such as disk 168.

FIG. 2 also illustrates the flow of backup data for data residing in computing environment 10. Data is pulled out of database 132, and is backed up or copied by backup client 140 and sent across network device, 152 to a backup server 164. The backup data is physically stored on storage device, such as a virtual tape library with deduplication capability 172.

Figure 3:
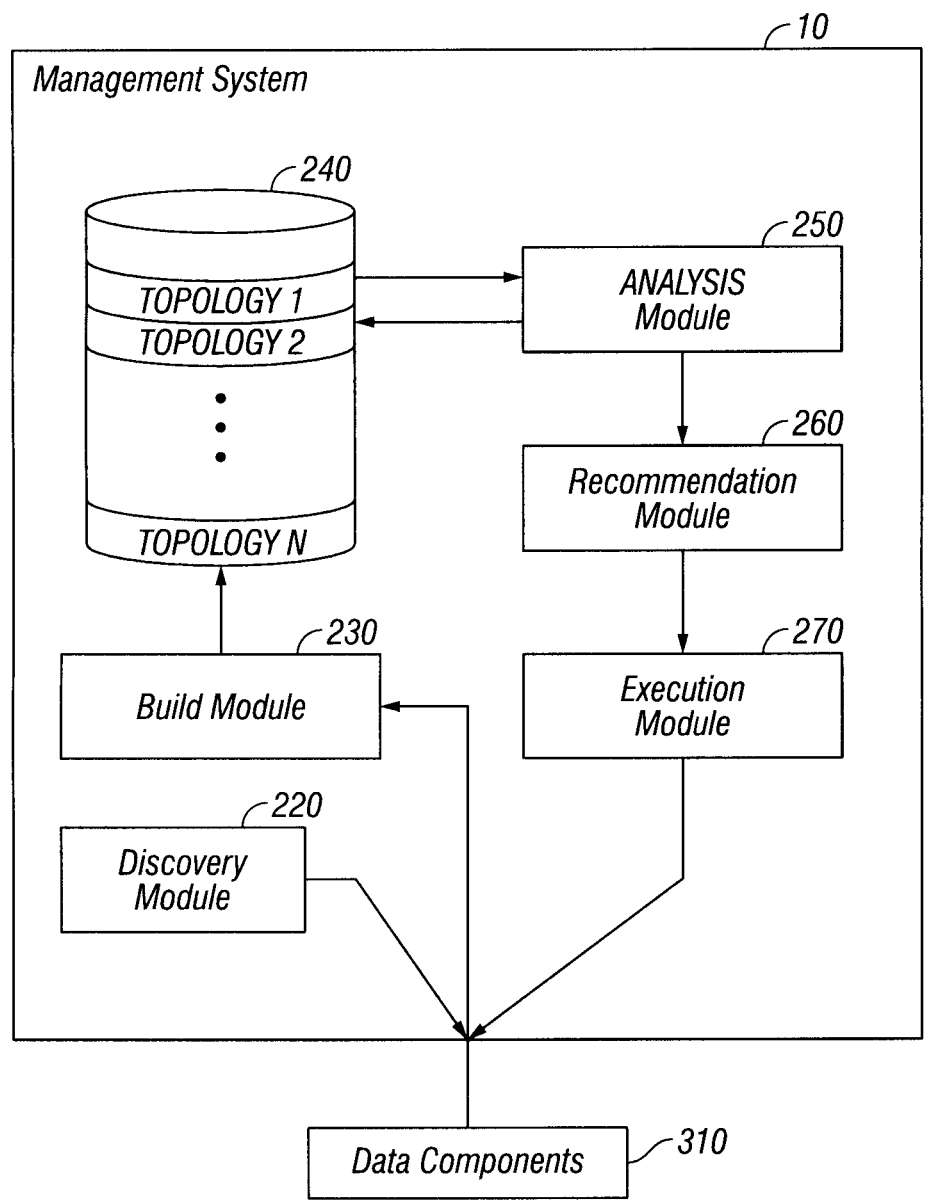
FIG. 3 is a diagram illustrating the performance of the management system in accordance with an embodiment of the invention.

FIG. 3 is a diagram illustrating the performance of the management system 100 in accordance with an embodiment of the invention. The illustration includes management system 100 coupled to data components 310. Data components may include, but are not limited to, database 132, email application 134, file system 136, host volume manager 138, backup client 140, network devices 152, storage devices 154, file servers 162, backup servers 164, archive servers 166, disk 168, tape 170, and virtual tape (e.g. with deduplication capability) 172.

In an example of an embodiment of the present invention, the management system 100 of the computing environment 10 is able to identify all the data components in a data path where encryption, deduplication and compression are performed. Further, the management system 100 has the ability to analyze the data management operations and the impacts of the data management operations on other data management operations within the data path and the overall computing environment. Using the analysis, an administrator or user may be notified of potential non-optimal configurations. For example, such non-optimal configurations may include performing encryption before deduplication, performing encryption before compression, performing redundant encryption, performing redundant deduplication, and performing redundant compression. These potential non-optimal configurations may consume large amounts of system resources. After the analysis is complete, the management system can provide recommendations to potentially optimize the computing environment 10 through the reconfiguration of the data management operation configuration.

For example, the management system 100 of computing environment 10 may include multiple modules, physical and logical. The physical modules may include memory, a processor, and network communication paths. The logical modules may include a discovery module 220, a build module 230, an analysis module 250, a recommendation module 260, and an execution module 270. These physical and logical modules work together to enable the discovery, build, analysis, and ultimately, provide recommendations to optimize the computing environment.

Specifically, the discovery module 220 is used to discover or identify every physical and/or logical components that are considered data components 310 of the computing environment 10. For example, one can have a logical component, such as a database 132 or an email application 134 as a data component 310. From a physical perspective, a network device 152, such as a router or a switch may be used as a data component 310. It should be appreciated that each data component 310 may perform the data management operations of encryption, deduplication, and compression, individually, or in combination. For example, an email application may be performing only encryption, or it may be performing encryption, deduplication and compression. It should also be appreciated that the data management operations at each data component may be configured and be turned on and off according to a determined optimal configuration. Still further, it should be recognized that when a data component is added to, or removed from, the computing environment 10, a non-optimal configuration may result.

Returning to the discovery module 220. The discovery module 220 can identify, using a network, where encryption, deduplication and compression occur in data components 310 as shown in FIG. 3. Once the data components 310 and data management operations are identified, the build module 230 stores the data management operations in the nodes of a data structure representing the data flow topology. For example, the data management operations of encryption, deduplication, and compression are stored within each node of the data structure. Data flow topologies are the networks of data components and their interconnections that represent the path of data during its lifecycle. Various data flow topologies 1-N, as shown in FIG. 3, may be stored in the management database 240. These data flow topologies can be represented using any data structure. For example, the data flow topology can be represented with an array, a linked list, or a tree structure. One data flow topology, for example data flow topology 1, may describe a data path through the data components 310 that only operate on primary data. Yet another data flow topology, such as data flow topology 2, may include information from a data path including data components 310 for data backup operations.

Once the data management operations are stored to within the nodes of the data flow topologies described in FIG. 3, the analysis module 250 of the management system 100 gathers the stored information from the data flow topology and applies policy 280. In the analysis module 250, for example, gathering each encryption, deduplication, and compression event includes examining each node of the data structure and, identifying whether a variable is set to indicate the presence of such a data management operation. For example there may be an encryption, deduplication or compression variable set.

The analysis module 250 begins accumulating where these data management operations occur in the data components and the order in which the data management operations are performed in the data components 310. The analysis module 250 then applies policy 280. For example, based on specific policy 280, the analysis module may determine whether encryption is being performed before deduplication, encryption is performed before compression, and whether redundant encryption, redundant deduplication, or redundant compression is performed. For example, policy 280 may be a policy to avoid redundant deduplication. Accordingly, by applying the policy 280, of avoiding redundant deduplication, deduplication will only occur once in the data path. It should be understood by one of ordinary skill in the art that it would be a non-optimal configuration if every component within a primary data path performed deduplication. Deduplication refers to the elimination of redundant data. Thus, performing deduplication on already deduplicated data unnecessarily utilizes system resources, such as processor server time. Therefore, it is important that these non-optimal configurations are identified. In another example, policy 280 may require that deduplication is performed before encryption. Accordingly, analysis module 250 identifies where encryption is performed before deduplication along the path of the data flow.

The analysis module 250 gathers the information stored in the data flow topology, applies the policy 280, and the recommendation module 260 provides a recommendation to the administrator or to another module of the management system 100. Thereafter, an execution module 270 awaits instructions from an administrator or from another process of the management system 100 to execute the provided recommendation. The execution module 270 reconfigures the data components of the data path accordingly, such that it adheres to the recommendations. In another example, the execution module 270 of the management system 100 may be configured to automatically reconfigure the data components 310 in response to the recommendations from recommendation module 260. For example, the recommendations may include performing deduplication at the first data component of the data path only. Yet another recommendation may be to perform deduplication at a first data component of the data path and performing encryption at a subsequent data component of the data path.

Figure 4:
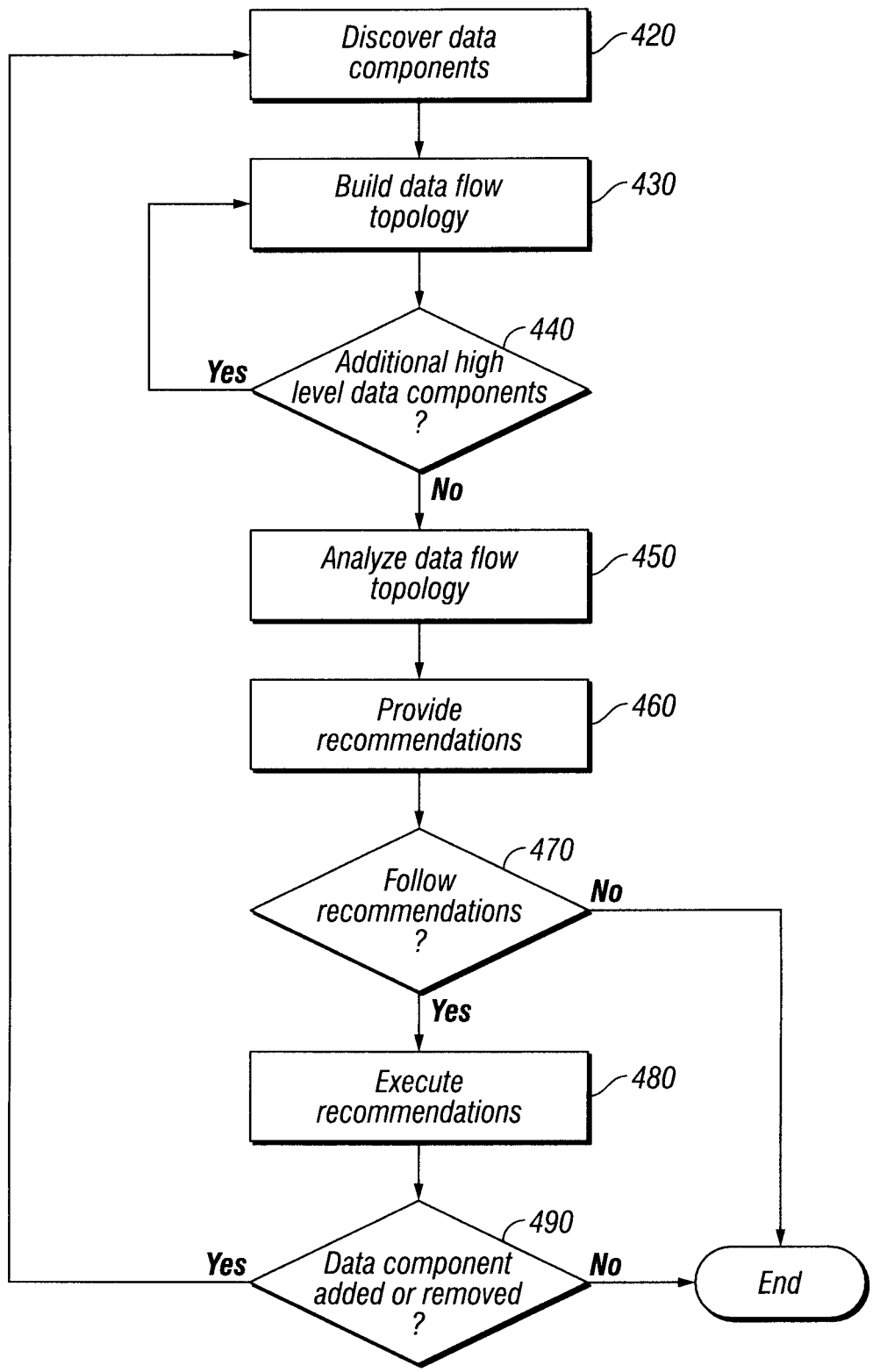
FIG. 4 is a flow chart of operations for managing data management operations of a computing environment in accordance with an embodiment of the invention.

FIG. 4 is a flow chart of operations for management system 100 in managing data management operations of a computing environment in accordance with an embodiment of the invention. The operations begin with step 420 where the discovery module 220 of management system 100 discovers all data components 310 within the computing environment, the interconnections between the data components 310, the data management operations performed at each data component 310, and how many data management operations of each type are performed at each data component 310. In addition, discovery module 220 discovers configuration information of each component 310, including, but not limited to: a data component ID, a data component type; a data component vendor; a data component product, a data component location; data component processor; an encryption type, a deduplication type, a compression type, an encryption operation, a deduplication operation, a compression operation, encryption capability, deduplication capability, compression capability, encryption transparency, and a compression transparency.

For example, discovery module 220 discovers all of the data components 310 within the computing environment 10 (as shown in the exemplary computing environment of FIG. 2) including database 132, file system 136, host volume manager 138, network device, 152, disk 168, backup client 140, backup server 164, and virtual tape system with deduplication 172. The discovery module 220 queries each data component 310 and discovers configuration information, as described above, of each component.

The discovery module 220 may discover the data components 310 and the interconnections between the data components by querying storage resource management (SRM) solutions or configuration management data bases (CMDB). In one embodiment, the IBM® Tivoli Storage Productivity Center (TPC) may be queried to discover data components 310. The queries may be done utilizing application programming interfaces (APIs), command line interfaces (CLIs), small computer system interfaces (SCSI), or the like. In another embodiment, all of the data components 310, and the interconnections between the data components in the environment are manually entered into management database 240. In yet another embodiment, the discovery module 220 discovers data components utilizing a combination of the above embodiments. For example, the discovery module 220 may discover some of the data components 310 utilizing queries and other data components 310 may be entered manually into management database 240.

The discovered data components 310 and their configuration information may be stored in a database such as management database 240. In one embodiment, management database 240 may be a relational database.

Figure 5:
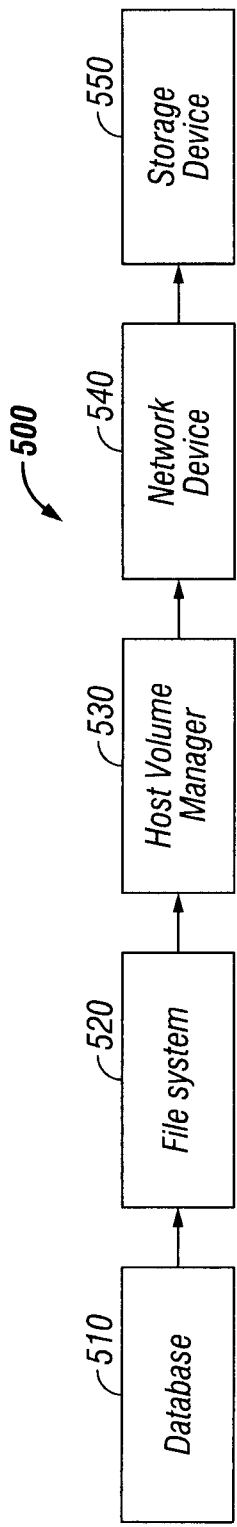
FIG. 5 is diagram illustrating an example of a linked list for a primary path in an exemplary computing environment in accordance with an embodiment of the invention.

In step 430 the build module 230 builds a data flow topology. Data flow topologies are the networks of data components and their interconnections that represent the path of data during its lifecycle. For example, FIG. 5 shows an example of a data component topology of a primary data flow for data residing in an exemplary computing environment shown as shown in FIG. 2.

The data flow topology may be represented using a linked list representing the flow of data through the data components. A linked list, as known in the art, is a data structure that includes a sequence of nodes containing fields of information, including a field that contains a reference (e.g. link) to the next node in the sequence. Each data component 310 is a node in the linked list or data structure. It should be appreciated that any data structure is possible. Further, it should be appreciated that the data structure may be statically or dynamically allocated.

The linked list begins with a data component that is a high level data representation. A high level representation is the level at which data is created, read, or written. In one embodiment the data flow topology is a linked list representing the primary flow of data and another data flow topology is a linked list representing backup flow of data. Primary flow of data may be defined as the data components that the data flows through from creation of the data to the storage of the data. The backup flow of data may be defined as the data components that the data flows through when creating a copy of the data. It is important to note the difference between the primary flow of data, where data initiates, and the backup flow of data, where data is copied. In primary flow of data, the data is being created and stored, and therefore, at the creation of data, no data management operations have been performed on the data. On the other hand, in some cases, the backup flow may already have data management operations performed on the data. It should be understood by one of ordinary skill in the art that the primary flow topology and the backup flow topology may include the same data components 310.

While the data flow topology in the present embodiment is described as a linked list, it should be understood by one of ordinary skill in the art, that the data flow topology may be represented by other data structures such as a tree structure, an array, a graphical representation, or other data structure common in the art.

The build module 230 receives the information that is discovered by the discovery module 220. In one embodiment, the build module 230 receives the discovered information about the data components 310 after all the data components are discovered and subsequently, the data build module builds the data flow topology. In another embodiment, the build module 230, builds the data flow topology on the fly, while the discovery process is ongoing. For example, the discovery module 220 may discover a data component 310 and, subsequently, the build module 230 receives information about the data component and builds a node that represents that data component. Thereafter, the discovery module 220 may discover another data component, and the build module 230 builds a node that represents that data component.

Beginning with a high level data component, the build module 230 creates a node in the data component structure for the data component. The build module 230 populates the node with information discovered in step 420.

The data component structure includes nodes, each node including fields, the fields having information such as: a back pointer that points to the previous data component structure in the linked list; a forward pointer that points to the next data component structure in the linked list; a data component ID which is a unique identifier for the data component; a data component type (e.g. database, email application, file system, etc,); a data component vendor which indicates the vendor associated with the data component (e.g. IBM, Microsoft, etc); a data component product which identifies the products associated with the data component (e.g. the IBM® Tivoli Storage Productivity Center (TPC); a data component location (e.g. source host, network, target host/media etc); data component processor (e.g. central processing unit (CPU), CPU offload, etc).

In addition, in an embodiment, the node of the data component structure for each data component includes an encryption type field, a deduplication type field, and a compression type field. In one embodiment, these fields are string text fields that indicate the type of encryption, deduplication and compression that is performed at the data component, respectively. The data component structure also includes for each data component an encryption operation field which identifies if data is encrypted or decrypted by the data component, a deduplication operation field which identifies if data is deduplicated or undeduplicated by the data component; a compression operation field which identifies if data is compressed or uncompressed by the data component.

For example, the data structure may indicate that encryption, deduplication, and compression are performed with a value of +1 stored in the corresponding field. Further, the data structure may indicate that encryption, deduplication and compression are not performed with a value of 0 in the corresponding field. Finally, the data structure may indicate that data is decrypted, undeduplicated, and uncompressed with a value of −1 in the corresponding field. One of ordinary skill in the art would recognize that the use of +1, 0, and −1 is arbitrary in all fields described herein, and that any other method can be used to indicate the presence of encryption, deduplication, and/or compression within the data component structure.

Further, in an embodiment, the node of the data component structure includes an encryption capability field, a deduplication capability field, and a compression capability field. These fields include information about the capability of the data component to perform encryption, deduplication, and compression, respectively. For example, a value of 1 may be stored in the encryption capability field if the data component is capable of performing encryption. A value of 0 may be stored in the encryption capability field if the data component is not capable of performing encryption. Similarly, a value of 1 may be stored in the deduplication or compression capability field if the data component is capable of performing deduplication or compression, respectively. A value of 0 may be stored in the deduplication or compression capability field if the data component is not capable of performing encryption or compression, respectively.

Still further, in an embodiment, the node of the data component structure also includes an encryption transparency field and a compression transparency field. Transparency refers to whether the data management operations (e.g. encryption and compression) are performed without knowledge or impact to other data components. For example, compression may be transparent to other data components when a data component compresses the data and, then, upon access to the data the data component uncompresses the data. Similarly, encryption may be transparent to other data components when encrypted data is automatically unencrypted upon access to the data. In one embodiment, the encryption transparency field may be null if no encryption is performed by the data component. Similarly, the compression transparency field may be null if no compression is performed by the data component.

Figure 7:
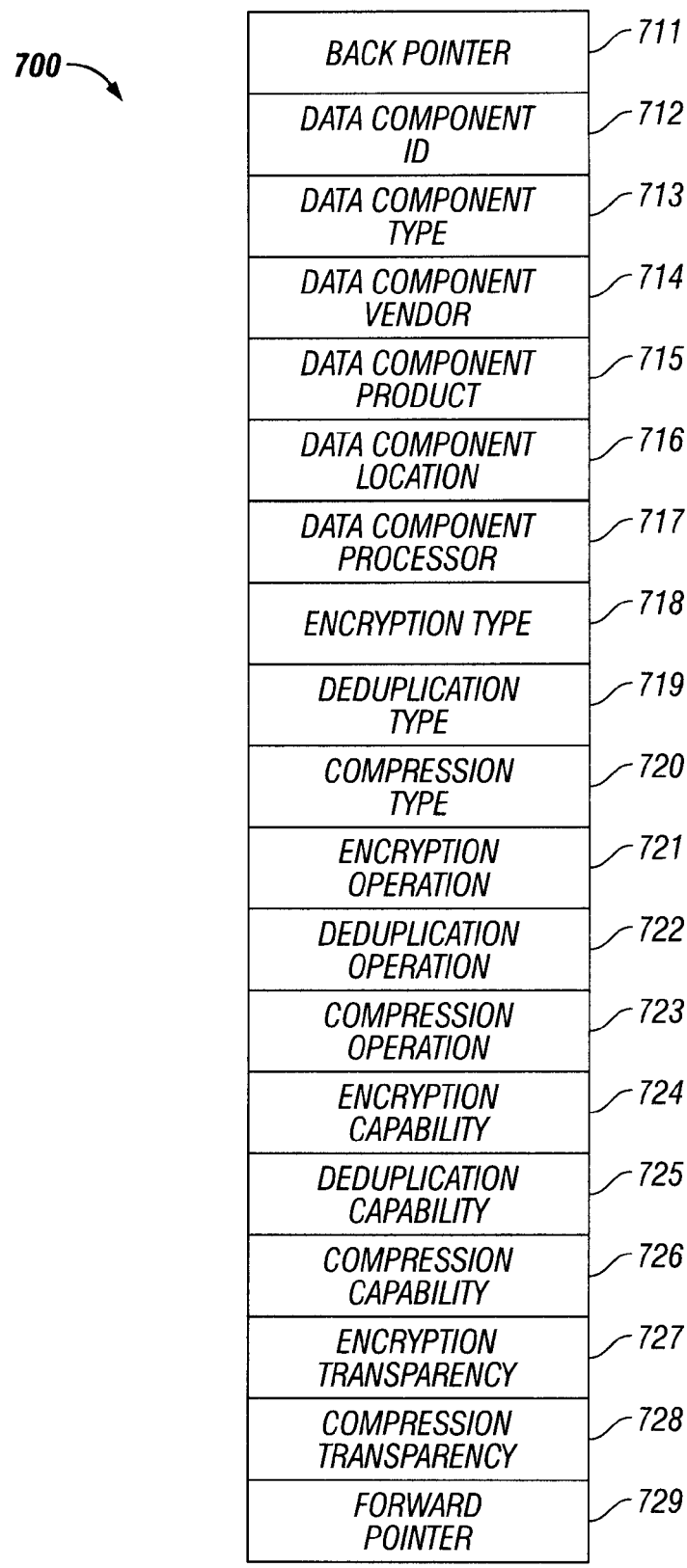
FIG. 7 is a diagram illustrating an example of a node of a linked list in accordance with an embodiment of the invention.

For example, referring back to the exemplary computing environment illustrated in FIG. 2, the build module 230 recognizes database 132 as a high level data component and creates a node 510 for database 132 in a linked list as shown in FIG. 5. An example of a node is shown in FIG. 7. As seen in FIG. 7, the node 700 includes information about the data component. The data component information includes, but is not limited to: a back pointer 711; a forward pointer 729; a data component ID 712; a data component type 713; a data component vendor 714; a data component product 715; a data component location 716; data component processor 717; an encryption type 718; a deduplication type 719; a compression type 720; an encryption operation 721; a deduplication operation 722; a compression operation 723; encryption capability 724; a deduplication capability 725; compression capability 726; encryption transparency 727; and a compression transparency 728. One of ordinary skill in the art would realize that the order of information presented within the fields of the node is merely arbitrary and may be presented in any order. Additional information about the data component that might assist in the analysis of the data flow topology might also be stored in the node.

As noted above, the data component information includes a back pointer and a forward pointer that reveals the interconnections between the data components. The forward pointer points to the next data component to which the data flows. Accordingly, the build module 230 creates another node for the next data component. For example, referring back to FIG. 2, the next node in the primary flow of data is the file system 136. The build module 230 creates a node 520 for file system 136 in the linked list as shown in FIG. 5. The build module 230 populates node 520 with data component information discovered in step 420. Similarly, the build module creates and populates node 530 for host volume manager 138, node 540 for network device 152, and node 550 for storage device 168 as shown in FIG. 5.

Figure 6:
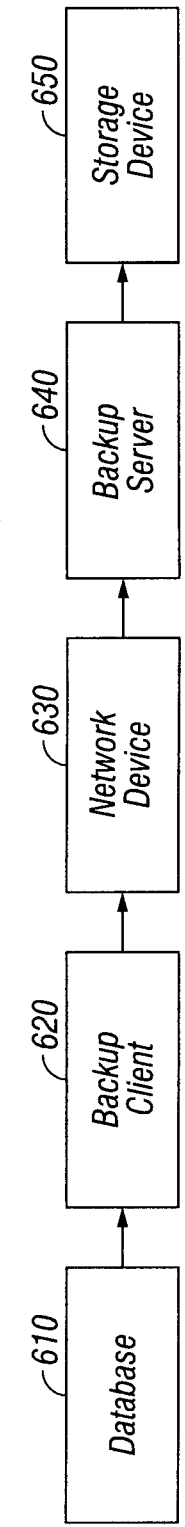
FIG. 6 is a diagram illustrating an example of a linked list for a backup path in an exemplary computing environment in accordance with an embodiment of the invention.

In a similar manner, in step 430, the build module 230 builds the data flow topology for the flow of data through a backup process. Beginning with a high level data component, the build module 230 creates a node in the data structure for the data component. The build module 230 populates the node with information discovered in step 420. For example, referring to FIG. 2, the build module 230 recognizes database 132 as a high level data component and creates a node 610 for database 132 in a linked list as shown in FIG. 6. In the exemplary embodiment, the next node in the backup flow of data is backup client 140. The build module 230 creates a node 620 for backup client 140 in the linked list as shown in FIG. 6. The build node 230 populates node 620 with data component information discovered in step 420. Similarly, the build module creates and populates node 630 for network device 152, node 640 for backup server 164, and node 650 for storage device, such as virtual tape with deduplication capability 172 as shown in FIG. 6.

In step 440, of FIG. 4, the build module determines if there are additional high level data components. If there are no additional high level data components the process flows to step 450. If there are additional high level data components the process flows to step 430, wherein the build module builds a data flow topology for the remaining high level data components in the same manner as discussed with respect to step 430 above.

The completed data flow topologies (e.g. 500, 600) provide a picture of the data components within the computing environment, how there are interconnected, the data management operations performed, the order of the data management operations, and how many data management operations of each type are performed at each data component. The build module stores all of the resulting data component topologies (e.g. topology 1, topology 2, . . . topology N) in management database 240. It will be noted that the variable identifier "N" is used to more simply designate the final element (e.g., servers 110(1)-(N)) of a series of related or similar elements.

In step 450 the analysis module 250 receives data flow topologies 500, 600 from management database 240 and analyzes the data flow topologies in view of policy 280. Policy 280 may include network security policies (e.g. requiring encryption before data is transmitted across a network), storage residency security policies (e.g. requiring encryption when storing data on a storage device), network bandwidth optimization policies (e.g. requiring deduplication or compression before data is transmitted across a network), system resource optimization policies (specifying whether host system resources should be used for deduplication, encryption or compression), storage space optimization policies (e.g. requiring data be compressed)

In one embodiment, the analysis may be done by utilizing counters or variables. For example, as described above, each node of the data component structure (e.g. a linked list) includes a field that indicates whether encryption, deduplication, or compression is performed with a value of +1, 0, and −1 stored in the corresponding field (e.g. field 821, 822, and 823, respectively as shown in FIG. 7). The analysis module 250, maintains a count of the nodes within the data path that perform each of the data management operations. For example a count is maintained of the number of time encryption is performed throughout the data flow, a count is maintained of the number of times deduplication is performed throughout the data flow, and a count is maintained of the number of times compression is performed throughout the data flow.

For example, consider the computing environment represented in FIGS. 2 and 5, and in which the database 132 is configured to perform encryption, and network device 152 is configured to perform encryption. Further, in this example, policy 280 is set such that no redundant data management operations are performed. Referring now to FIG. 7, field 721 of database node 510 would hold a value of +1 to indicate that the database 132 performed encryption. Similarly, field 721 of network device 540 would hold a value of +1 to indicate that the network device performed encryption. Thus, in this example the counter monitoring encryption throughout the data flow would indicate a value of +2, signifying that encryption is being performed redundantly.

Once the analysis module 250 analyzes the data flow topologies 500, 600 the recommendation module 260, in step 460, provides recommendations to reconfigure the data components such that the policy 280 is met. In one embodiment, the recommendations are provided upon a user request. In another embodiment, the recommendations are provided at regular, predetermined intervals. In an embodiment, the regular intervals are set by an administrator or a user. For example, the recommendation module 260 is configured to provide recommendations every week. Alternatively, the recommendation module 260 is configured to provide recommendations when an additional data component is added, or when a data component is removed from the data flow.

The recommendations may be provided on a graphical user interface (GUI), as scripted commands, as written recommendations, or via some other communications means well known to those skilled in the art. Alternatively, the recommendations may not be displayed and the process flows immediately to step 480. In one embodiment, the recommendations are provided to the administrator or user such that the administrator or user can indicate if the recommendation should be followed. For example, a GUI interface may indicate that a redundant deduplication operation has been found, and provides a recommendation to remove the second deduplication operation within the data flow. The GUI interface displays a message to the administrator or user asking if the recommendation should be followed. For example, a message of "Execute recommendation?" may be displayed. In step 470, the administrator or user can indicate that the recommendation should not be followed and the process ends. Alternatively, if the administrator or user indicates that the recommendation should be followed in step 470 then the process flows to step 480.

In step 480 the execution module 270 executes the recommendation provided by the recommendation module 260. The execution module 270 sends commands to the management system 100 to reconfigure the data components. For example, if a Once the execution module 270 executes the recommendations the process flows to step 490. In step 490, the discovery module determines whether additional data components have been added. Alternatively, the discovery module 220 may also determine if any data components have been removed. The addition or removal of a data component may change the data flow topology and, thus may require a reconfiguration of data management operations. If it is determined in step 490 that additional data components have been added or data components have been removed from the data flow the process returns to step 420 wherein the data components are discovered. On the other hand if no additional data components are added or no data components have been removed the process ends.

While only one management system is shown, it should be understood by one of ordinary skill in the art that a plurality of management systems may be interconnected.

It should be appreciated that such operations can be embodied as a method implemented as an algorithm having software modules that are implemented by a computing system. Further, the method can be embodied as software on any computer readable media, as dedicated firmware, or as a combination of software and firmware, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term logic may include, by way of example, software, hardware, firmware, and/or combinations of software and hardware.

Figure 8:
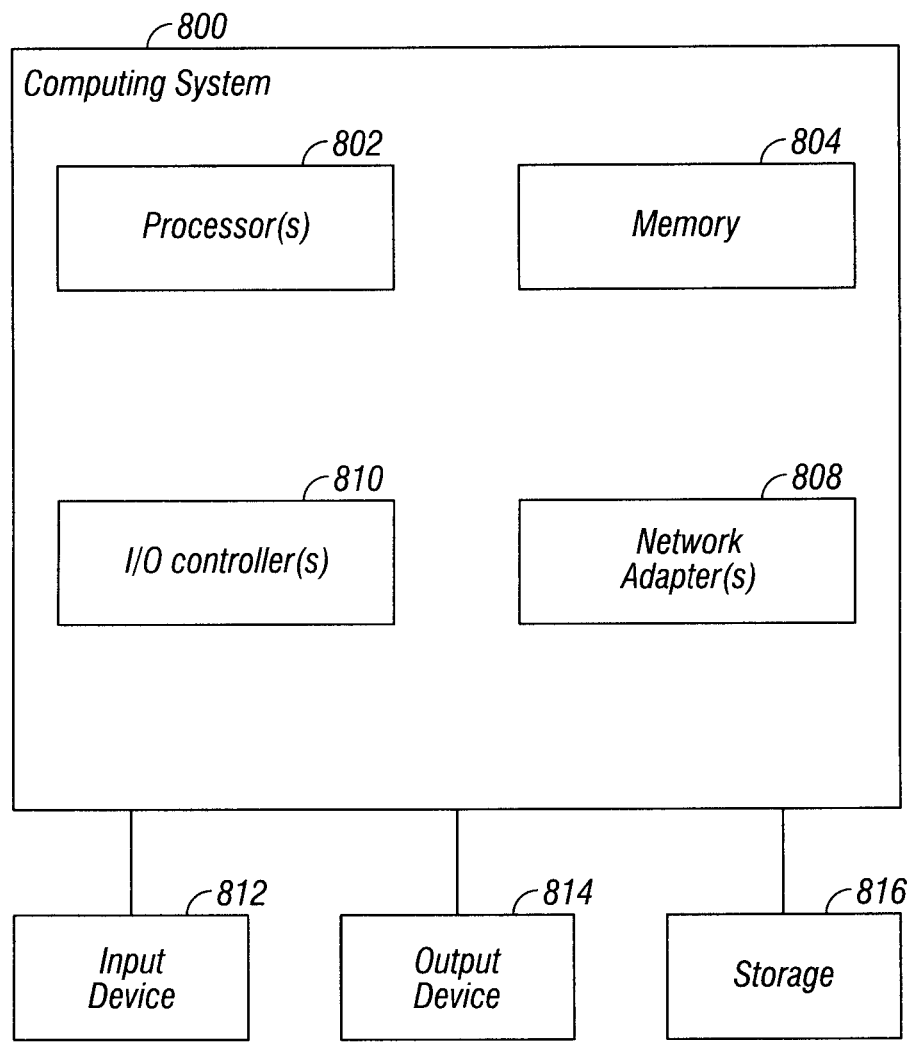
FIG. 8 illustrates a computing system that may be used in accordance with certain embodiments.

FIG. 8 illustrates a computing system 800 that may be used in accordance with certain embodiments. Computing environment 10 and/or Management system 100 may implement computing system 800. The computing system 800 is suitable for storing and/or executing program code and includes at least one processor 802 coupled directly or indirectly to memory elements 804 through a system bus (not shown). The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system and one or more computer programs (not shown).

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computing system 800 may be coupled to storage 816 (e.g., a non-volatile storage area, such as magnetic disk drives, optical disk drives, a tape drive, solid state storage devices, etc.). The storage 816 may comprise an internal storage device or an attached or network accessible storage. Computer programs in storage 816 may be loaded into the memory elements 804 and executed by a processor 802 in a manner known in the art.

The computing system 800 may include fewer components than illustrated, additional components not illustrated herein, or some combination of the components illustrated and additional components. The computing system 800 may comprise any computing device known in the art, such as a mainframe, server, personal computer, workstation, laptop, handheld computer, telephony device, network appliance, virtualization device, storage controller, mobile device, for example a personal digital assistant (PDA) or mobile phone, etc.

The foregoing description of embodiments of the invention has been presented for the purposes of illustration and description. It is not intended to be exhaustive or to limit the embodiments to the precise form disclosed. Many modifications and variations are possible in light of the above teaching It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer implemented method for data management of a computing environment, comprising:
analyzing a data flow topology of data components within said computing environment, wherein said data flow topology comprises an order of data management operations performed on data by the data components performing different types of operations on the data, wherein the data flow topology comprises a data structure representing the data components, interconnections between the data components, and a configuration of each of the data components;
evaluating said data flow topology in view of a data management policy; and
determining from the evaluated data flow topology an optimal sequence of said data management operations by the data components within said computing environment.

2. The computer implemented method of claim 1, further comprising providing a recommended configuration of said data components within said computing environment to achieve said optimal sequence of data management operations.

3. The computer implemented method of claim 2, further comprising executing said recommended configuration of said data components within said computing environment.

4. The computer implemented method of claim 1, wherein said configuration comprises at least one of a back pointer, a forward pointer, a data component ID, a data component type, a data component vendor, a data component product, a data component location, data component processor, an encryption type, a deduplication type, a compression type, an encryption operation, a deduplication operation, a compression operation, encryption capability, a deduplication capability, compression capability, encryption transparency, and a compression transparency.

5. The computer implemented method of claim 1, further comprising in response to determining an optimal sequence of said data management operations within said computing environment reconfiguring said data components.

6. The computer implemented method of claim 1, wherein a data management operation is one of encryption, deduplication, and compression.

7. The computer implemented method of claim 1, wherein said optimal sequence comprises a sequence of data management operations that meets data management policy.

8. The computer implemented method of claim 6, wherein said data management policy comprises avoiding at least one of redundant encryption, redundant deduplication, redundant compression, the performance of encryption before deduplication, and the performance of encryption before compression.

9. A computing environment comprising:
a processor of a management system;
a memory coupled to said processor;
said memory including computer readable instructions implemented by said processor to:
analyze a data flow topology of data components within said computing environment, wherein said data flow topology comprises an order of data management operations performed on data by data components performing different types of operation on the data, wherein said data flow topology comprises a data structure representing the data components, interconnections between the data components, and a configuration of each of the data components;
evaluate said data flow topology in view of a data management policy; and
determine from the evaluated data flow topology an optimal sequence of said data management operations by the data components within said computing environment.

10. The computing environment of claim 9, wherein the computer readable instructions are implemented on a computer and further cause the computer to provide a recommended configuration of said data components within said computing environment to achieve said optimal sequence of data management operations and executing said recommended configuration of said data components within said computing environment.

11. The computing environment of claim 9, wherein the computer readable instructions are implemented on a computer and further cause the computer to reconfigure said data components in response to the determination of an optimal sequence of said data management operations.

12. The computing environment of claim 9, wherein said optimal sequence comprises a sequence of data management operations that avoids at least one of redundant encryption, redundant deduplication, redundant compression, the performance of encryption before deduplication, and the performance of encryption before compression.

13. The computer implemented method of claim 1, wherein the data components include an encryption components and a deduplication component, wherein the determined optimal sequence of data management operations specifies the deduplication component to perform deduplication of the data before the encryption component encrypts the data.

14. The computer implemented method of claim 1, wherein the data components include an encryption component and a compression component, wherein the determined optimal sequence of data management operations specifies the compression component to perform compression of the data before the encryption component encrypts the data.

15. The computing environment of claim 9, wherein the data components include an encryption component and a deduplication component, wherein the determined optimal sequence of data management operations specifies the deduplication component to perform deduplication of the data before the encryption component encrypts the data.

16. The computing environment of claim 9, wherein the data components include an encryption component and a compression component, wherein the determined optimal sequence of data management operations specifies the compression component to perform compression of the data before the encryption component encrypts the data.

* * * * *